United States Patent
Chen et al.

(10) Patent No.: US 9,629,228 B2
(45) Date of Patent: Apr. 18, 2017

(54) ELECTRIC ENERGY SUPPLY DEVICE WITH DATA BRIDGE FUNCTION AND WIRELESS LIGHTING CONTROL SYSTEM INCLUDING THE SAME

(71) Applicant: HEP TECH CO., LTD., Taichung (TW)

(72) Inventors: Po-Yen Chen, Taipei (TW); Ta-Sheng Hung, Taichung (TW)

(73) Assignee: HEP TECH CO., LTD., Taichung (TW)

( * ) Notice: Subject to any disclaimer, the term of this patent is extended or adjusted under 35 U.S.C. 154(b) by 0 days.

(21) Appl. No.: 15/012,117

(22) Filed: Feb. 1, 2016

(65) Prior Publication Data

US 2016/0242262 A1 Aug. 18, 2016

(30) Foreign Application Priority Data

Feb. 13, 2015 (TW) .............................. 104105103 A

(51) Int. Cl.
| | |
|---|---|
| H05B 37/02 | (2006.01) |
| H05B 33/08 | (2006.01) |
| H04W 4/00 | (2009.01) |
| H04L 29/08 | (2006.01) |
| H04L 12/28 | (2006.01) |

(52) U.S. Cl.
CPC ......... *H05B 37/0272* (2013.01); *H04L 67/12* (2013.01); *H04W 4/008* (2013.01); *H05B 33/0842* (2013.01); *H05B 37/0254* (2013.01)

(58) Field of Classification Search
CPC . H05B 37/0272; H05B 33/0842; H04L 67/12; H04L 12/2803; H04W 4/008

USPC .......................................................... 315/312
See application file for complete search history.

(56) References Cited

U.S. PATENT DOCUMENTS

| | | | | |
|---|---|---|---|---|
| 2011/0260652 | A1* | 10/2011 | Hsieh ................. | H05B 37/0272 315/312 |
| 2012/0044371 | A1* | 2/2012 | King .................... | H04N 5/2256 348/211.2 |
| 2014/0001972 | A1* | 1/2014 | Harris ................ | H05B 33/0842 315/200 R |
| 2014/0139140 | A1* | 5/2014 | Yeh ........................ | G05B 24/02 315/297 |

(Continued)

*Primary Examiner* — Dylan White
(74) *Attorney, Agent, or Firm* — WPAT, PC; Justin King

(57) ABSTRACT

An electric energy supply device for powering at least one lighting device may include a first wireless communication module, a multiplexing module and a driving module. The first wireless communication module may receive or transmit a first control signal based on the first wireless network communication protocol. The multiplexing module may identify the communication protocol type of the first control signal. The driving module may drive the light device according to the first control signal. According the communication protocol type, the multiplexing module may determine whether to control the driving module to drive the lighting device according to the first control signal or transmit the first control signal to the first controlled device corresponding to the communication protocol type to remotely control the first controlled device by using other electric energy supply devices as the data bridge path after receiving the first control signal via the first wireless communication module.

21 Claims, 7 Drawing Sheets

(56) References Cited

U.S. PATENT DOCUMENTS

| | | | |
|---|---|---|---|
| 2014/0320022 A1* | 10/2014 | Lee ................... | H05B 37/0245 315/152 |
| 2016/0063853 A1* | 3/2016 | Mi ........................ | G08C 17/02 340/12.5 |
| 2016/0242256 A1* | 8/2016 | Kim ................... | H05B 33/0872 |

* cited by examiner

ELECTRIC ENERGY SUPPLY DEVICE WITH DATA BRIDGE FUNCTION AND WIRELESS LIGHTING CONTROL SYSTEM INCLUDING THE SAME

CROSS REFERENCE TO RELATED APPLICATION

All related applications are incorporated by reference. The present application is based on, and claims priority from, Taiwan Application Serial Number 104105103, filed on Feb. 13, 2015, the disclosure of which is hereby incorporated by reference herein in its entirety.

TECHNICAL FIELD

The technical field relates to an electric energy supply device, in particular to an electric energy supply device capable of providing electric energy for electronic devices. The technical field further related to a wireless lighting control system including the electric energy supply device.

BACKGROUND

A wireless lighting control system allows a user to remotely control the lighting devices in a building, which is more convenient in use; therefore, the wireless lighting control system has become a trend in the future. However, the conventional wireless lighting control system still has a lot of shortcoming to be overcome.

For example, the conventional wireless lighting control system should, in general, transmit the control signals via WiFi wireless communication network; WiFi wireless communication network has great data transmission ability, but it has higher power consumption; accordingly, WiFi wireless communication network will generate serious electromagnetic radiation, which will influence the health of users.

Also, the cost of WiFi wireless communication network is very high, so the overall cost of the conventional wireless lighting control system will be significantly increased; besides, the data amount of the control signal for controlling the lighting devices is usually low; therefore, it is completely a waste to use WiFi wireless communication network to transmit the control signal of low data amount.

Although WiFi wireless communication network is of high performance, the coverage range of WiFi wireless communication network is still limited; thus, if a controlled device is not within the coverage rage of the WiFi wireless communication network, the user cannot control the controlled device via WiFi wireless communication network.

Moreover, the conventional wireless lighting control device is only used to control the lighting devices in the building; however, most of the lighting devices are turned on at the morning and then turned off at night, so the lighting devices will not be frequently turned on or turned off; therefore, the conventional wireless lighting control system is actually idle at most of time, so the utilization rate of the conventional wireless lighting control system is low.

Furthermore, the conventional wireless lighting control system is only used to control the lighting devices in the building, but cannot be used to control other devices; thus, if the user wants to wirelessly control the other devices or perform other applications, the user should construct another independent communication network; therefore, the application of the conventional wireless lighting control system is limited.

Therefore, it has become an important to provide a wireless lighting control system capable of improving the shortcomings of the conventional wireless lighting control system, such as high electromagnetic radiation, insufficient coverage range, high cost, low utilization rate and inflexibility, etc.

SUMMARY

In view of the disadvantages of prior art, the object of the present invention is to provide an electric energy supply device and wireless lighting control system with data bridge function capable of overcoming the conventional problems, such as high electromagnetic radiation, insufficient coverage range, high cost, low utilization rate and inflexibility, etc.

To achieve the above object, the present invention provides an electric energy supply device, which may connect to at least one lighting device; the electric energy supply device may a first wireless communication module, a multiplexing module and a driving module. The first wireless communication module may receive or transmit a first control signal based on the first wireless network communication protocol. The multiplexing module may identify the communication protocol type of the first control signal. The driving module may drive the light device according to the first control signal. According the communication protocol type, the multiplexing module may determine whether to control the driving module to drive the lighting device according to the first control signal or transmit the first control signal to the first controlled device corresponding to the communication protocol type to remotely control the first controlled device by using other electric energy supply devices as the data bridge path after receiving the first control signal via the first wireless communication module.

In a preferred embodiment of the present invention, the electric energy supply device may further include a translation module, which may connect to the multiplexing module, the translation module may include a third wireless communication module, a second wireless communication module and a processing module. The third wireless communication module may receive or transmit the first control signal based on the first wireless network communication protocol. The second wireless communication module may receive or transmit a second control signal based on a second wireless network communication protocol. The processing module may be connected to the first wireless communication module and the second wireless communication module.

In a preferred embodiment of the present invention, when the multiplexing module determines that the communication protocol type is a digital addressable lighting interface protocol, the multiplexing module may control the driving module to drive the lighting device according to the first control signal.

In a preferred embodiment of the present invention, when the second communication module receives the second control signal from a second control device, the processing module may convert the second control signal into a converted signal based on the first wireless network communication protocol and transmits the converted signal to the multiplexing module via the third wireless communication module; the multiplexing module transmits the converted signal according to the communication protocol type of the converted signal to a second controlled device corresponding to the communication protocol type so as to remotely control the second controlled device.

In a preferred embodiment of the present invention, the electric energy supply device may be a LED driver, an electronic ballast, a power supply or a wireless charger.

In a preferred embodiment of the present invention, the translation module may be wirelessly or wiredly connected to the multiplexing module.

In a preferred embodiment of the present invention, the first wireless communication module and the third wireless communication module may be based on ZigBee wireless network communication protocol or Bluetooth wireless network communication protocol.

In a preferred embodiment of the present invention, the second wireless communication module may be based on ZigBee wireless network communication protocol, Bluetooth wireless network communication protocol, WiFi wireless network communication protocol, RFID wireless network communication protocol or Infrared wireless network communication protocol.

In a preferred embodiment of the present invention, Bluetooth wireless network communication protocol may be Bluetooth Low Energy wireless network communication protocol.

To achieve the above object, the present invention provides a wireless lighting control system, which may include a plurality of lighting devices, at least one first controlled device, a lighting control device, a first control device and a plurality of electric energy supply devices. The lighting control device may wirelessly control the lighting devices. The first control device may wirelessly control the first controlled device. Each of the electric energy supply devices may be connected to at least one of the lighting devices and receive a first control signal based on a first wireless network communication protocol. When any one of the electric energy supply devices receives the first control signal from the lighting control device or the first control device, the electric energy supply device may identify the communication protocol type of the first control signal according to the data of the first control signal so as to determine whether to control the lighting device corresponding to the electric energy supply device according to the first control signal or transmit the first control signal to a first controlled device corresponding to the communication protocol type by using other electric energy supply devices as a data bridge path so as to remotely control the first controlled device.

In a preferred embodiment of the present invention, each of the electric energy supply device may include a first wireless communication module, a multiplexing module and a driving module. The first wireless communication module may receive or transmit the first control signal based on the first wireless network communication protocol. The multiplexing module may connect to the first wireless communication module, and identify the communication protocol type of the first control signal according to the data of the first control signal. The driving module may be connected to the multiplexing module and may control the lighting device corresponding to the driving module according to the first control signal.

In a preferred embodiment of the present invention, when the multiplexing module determines the communication protocol type is a digital addressable lighting interface protocol, the multiplexing module may control the driving module to drive the lighting device according to the first control signal.

In a preferred embodiment of the present invention, when the multiplexing module receives the first control signal via the first wireless communication module, the multiplexing module may determine whether to use the first control signal to control the driving module to drive the lighting device according to the communication protocol type or serve as a data bridge path to transmit the first control signal to a first controlled device corresponding to the communication protocol type so as to remotely control the first controlled device.

In a preferred embodiment of the present invention, the wireless lighting control system may further include at least one second controlled device and a second control device. The second control device may wirelessly control the second controlled device.

In a preferred embodiment of the present invention, each of the electric energy supply devices may further include a translation module connecting to the multiplexing module, and the translation module may include a third wireless communication module, a second wireless communication module and a processing module. The third wireless communication module may receive or transmit the first control signal based on the first wireless network communication protocol. The second wireless communication module may receive or transmit a second control signal based on a second wireless network communication protocol. The processing module may be connected to the first wireless communication module and the second wireless communication module.

In a preferred embodiment of the present invention, when the second communication module receives the second control signal from the second control device, the processing module may convert the second control signal into a converted signal based on the first wireless network communication protocol and transmits the converted signal to the multiplexing module via the third wireless communication module; the multiplexing module may transmit the converted signal according to the communication protocol type of the converted signal to a second controlled device corresponding to the communication protocol type so as to remotely control the second controlled device.

In a preferred embodiment of the present invention, the electric energy supply devices may be LED drivers, electronic ballasts, power supplies or wireless chargers.

In a preferred embodiment of the present invention, the translation modules may be wirelessly or wiredly connected to the multiplexing modules.

In a preferred embodiment of the present invention, the first wireless communication modules and the third wireless communications may be based on ZigBee wireless network communication protocol or Bluetooth wireless network communication protocol.

In a preferred embodiment of the present invention, the second wireless communication modules may be based on ZigBee wireless network communication protocol, Bluetooth wireless network communication protocol, WiFi wireless network communication protocol, RFID wireless network communication protocol or Infrared wireless network communication protocol.

In a preferred embodiment of the present invention, Bluetooth wireless network communication protocol may be Bluetooth Low Energy wireless network communication protocol.

In summation of the description above, the electric energy supply device with data bridge function and the wireless lighting control system including the same according to the exemplary embodiments of the present invention may have the following advantages:

(1) According to one embodiment of the present invention, the wireless lighting control system can be implemented via a low-power wireless communication network, which will not generate serious electromagnetic radiation; therefore, the wireless lighting control system will not influence the health of the user, so is of higher safety.

(2) According to one embodiment of the present invention, the wireless lighting control system can be implemented via a wireless communication network with low data transmission amount, which is of low cost and sufficient for transmitting various control signals; therefore, the cost of the wireless lighting control system can be significantly reduced.

(3) According to one embodiment of the present invention, each of the electric energy supply devices of the wireless lighting control system can have a data multiplexer, which can recognize the communication protocol type of the received first control signal so s to determine whether the first control signal is used to control the lighting devices or other controlled devices; therefore, other control systems with the wireless network communication protocol the same with that of the wireless lighting control system can transmit the control signals via the wireless network communication system of the wireless lighting control system without the need to construct another independent wireless network communication system; therefore, the idle time of the wireless lighting control system can be decreased to effectively increase the utilization rate of the wireless lighting control system; accordingly, the wireless lighting control system is flexible in use.

(4) According to one embodiment of the present invention, each of the electric energy supply devices of the wireless lighting control system can have a wireless signal translator; thus, other control systems with the wireless network communication protocol different from that of the wireless lighting control system can transmit the control signals via the wireless network communication system of the wireless lighting control system without the need to construct another independent wireless network communication system; therefore, the idle time of the wireless lighting control system can be decreased to further increase the utilization rate of the wireless lighting control system; accordingly, the wireless lighting control system is more flexible in use.

(5) According to one embodiment of the present invention, each of the electric energy supply devices of the wireless lighting control system can serve as a relay point for transmitting the control signals; therefore, the whole wireless lighting control system can form a large data bridge path for transmitting the control signals for a long distance; accordingly, the coverage range of the wireless lighting control system can be effectively increased.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
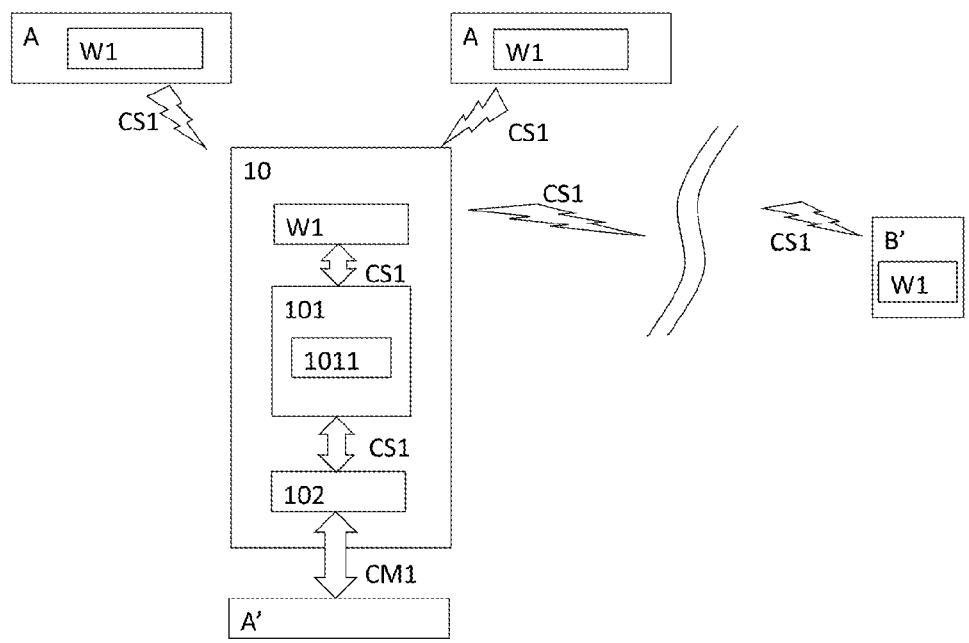
FIG. 1 is a block diagram of an electric energy supply device with data bridge function in accordance with the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With referent to FIG. 1 for a block diagram of an electric energy supply device with data bridge function in accordance with the present invention, the electric energy supply device 10 may be connected to a lighting device A' to power the lighting device A'; the electric energy supply device 10 may include a first wireless communication module W1, a processing module 101 and a driving module 102, wherein the processing module 101 may include a multiplexing module 1011. A lighting control device A may transmit a first control signal CS1 based on a first wireless network communication protocol via a first wireless communication module W1 so as to control the lighting device A'; a first control device B may transmit the first control signal CS1 based on the first wireless network communication protocol via the first wireless communication module W1 so as to control a first controlled device B'. In a preferred embodiment, the electric energy supply device 10 may be a LED driver, electronic ballast, power supply or wireless charger.

The first wireless communication module W1 may receive or transmit the first control signal CS1 based on the first wireless network communication protocol, and then transmit the first control signal CS1 to the processing module 101. The multiplexing module 101 of the processing module 101 may identify the communication protocol type of the first control signal CS1. The driving module 101 may generate a control command CM1 according to the first control signal CS1 to drive the lighting device A'. When the multiplexing module 101 receives the first control signal CS1 from the lighting control device A or the first control device B via the first wireless communication module W1, the multiplexing module 1011 may identify the communication protocol type of the first control signal CS1 according to the data of the first control signal CS1 so as to determine whether to control the driving module 102 to drive the lighting device A' according to the first control signal CS1 or transmit the first control signal CS1 to the first controlled device B' corresponding to the communication protocol type to remotely control the first controlled device B' by using other electric energy supply devices 10 as a data bridge path. In a preferred embodiment, the first wireless communication module W1 may transmit the first control signal CS1 based on ZigBee wireless network communication protocol, Bluetooth wireless network communication protocol, Bluetooth Low Energy wireless network communication protocol (BT4.0 or BLE), or other low-power wireless network communication protocols.

Via the above mechanism, the multiplexing module of the processing module 101 of the present invention can determine the target to be controlled according to the communication protocol type of the first control signal CS1. Thus, the first control device B with the wireless network communication protocol the same with that of the lighting control device A may transmit the control signals via the wireless network communication system composed of multiple electric energy supply devices 10 without the need to construct another independent wireless network communication system, which is more flexible in use.

Figure 2:
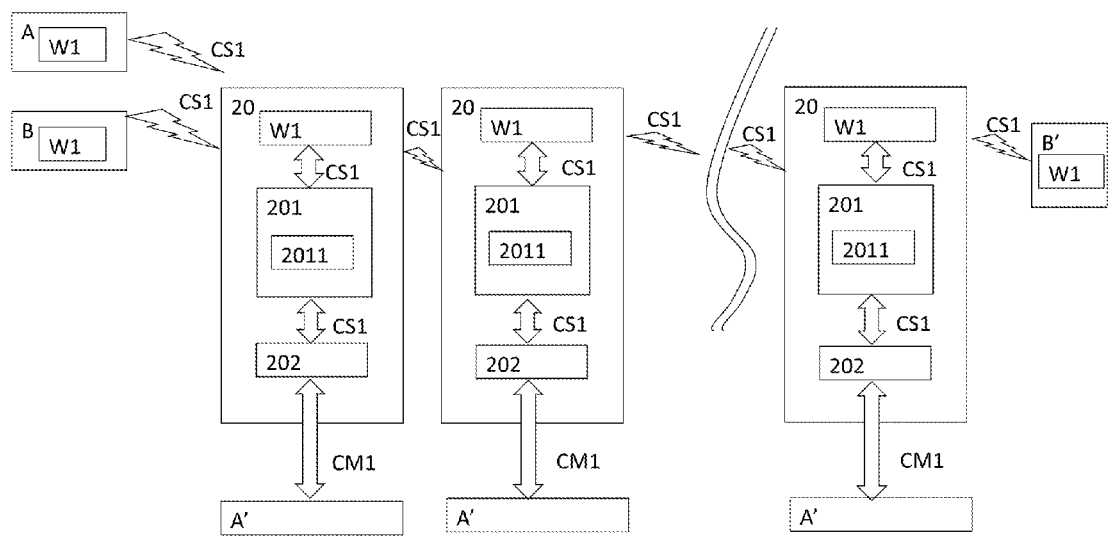
FIG. 2 is a schematic view of a first embodiment of a wireless lighting control system with data bridge function in accordance with the present invention.

With referent to FIG. 2 for a schematic view of a first embodiment of a wireless lighting control system with data bridge function in accordance with the present invention, the wireless lighting control system 2 may include a LED lighting control device A, a plurality of LED lighting device A', a first control device B, a first controlled device B' and a plurality of LED drivers 20.

The LED drivers 20 may be distributed over a building and there is a certain distance between any two adjacent LED drivers 20; each LED driver 20 may be connected to one LED lighting device A' to power it. The LED lighting control device A may transmit a first control signal CS1 based on ZigBee wireless network communication protocol to the LED drivers 20 via the first wireless communication module W1 so as to control the LED lighting devices A'. The first control device B may wirelessly transmit a first control signal CS1 based on ZigBee wireless network communication protocol via the first wireless communication module W1, and the first control signal CS1 may be transmitted to the first controlled device B' at a remote location by using the LED drivers 20 as the data bridge path.

Each LED driver 20 may include a first wireless communication module W1, a microcontroller unit 201 and a driving circuit 202; the microcontroller unit 201 may include a data multiplexer 2011. The first wireless communication module W1 may receive or transmit a first control signal CS1 based on ZigBee wireless network communication protocol, and the first control signal CS1 may be transmitted to the microcontroller unit 201. The data multiplexer 2011 of the microcontroller unit 201 may identify the communication protocol type of the first control signal CS1. The driving circuit 202 may generate a control command CM1 according to the first control signal CS1 to drive the LED lighting device A'.

When the data multiplexer 2011 receives the first control signal CS1 transmitted from the LED lighting control device A or the first control device B via the first wireless communication module W1, the data multiplexer 2011 may identify the communication protocol type of the first control signal CS1 according to the data of the first control signal CS1; then, according to the communication protocol type of the first control signal CS1, the data multiplexer 2011 may determine whether to control the driving circuit 202 to drive the LED lighting device A' according to the first control signal CS1 or use other LED drivers 20 as the data bridge path to transmit the first control signal CS1 to the first controlled device B' corresponding to the communication protocol type so as to remotely control the first controlled device B'.

More specifically, when the data multiplexer 2011 determines that the communication protocol type of the first control signal CS1 is corresponding to the LED lighting device A', the data multiplexer 2011 may transmit the first control signal CS1 to the driving circuit 202 and the driving circuit 202 may generate the control command CM1 according to the first control signal CS1 to drive the LED lighting device A'; when the data multiplexer 2011 determines that the communication protocol type of the first control signal CS1 is corresponding to the first controlled device B', the data multiplexer 2011 may transmit the first control signal CS1 to the adjacent LED driver 20, and then use other LED drivers 20 as the data bridge path to transmit the first control signal CS1 to the first controlled device B' corresponding to the communication protocol type so as to remotely control the first controlled device B'.

For example, the data multiplexer 2011 may determine whether the communication protocol type of the first control signal CS1 is the digital addressable lighting interface (DALI) protocol for controlling the LED lighting device A'; if it is, the data multiplexer 2011 may generate the control command CM1 according to the first control signal CS1 to drive the LED lighting device A'; if it is not, the data multiplexer 2011 may use other LED drivers 20 as the data bridge path to transmit the first control signal CS1 to the LED driver 20 near the first controlled device B', and then the first control signal CS1 may be transmitted to the first controlled device B' via the LED driver 20 so as to remotely control the first controlled device B'.

It is worthy to point out that the conventional wireless lighting control system should transmit control signals via WiFi wireless communication network; however, WiFi wireless communication network is not only of high cost, but also will generate serious electromagnetic radiation, which will influence the health of the user. On the contrary, according to one embodiment of the present invention, the wireless lighting control system can be implemented via a low-power and low-cost wireless communication networks, such as ZigBee wireless communication network, Bluetooth wireless communication network and Bluetooth Low Energy wireless communication network, etc., so the wireless lighting control system will not generate serious electromagnetic radiation to influence the health of the user; therefore, the wireless lighting control system is not only of higher safety, but also of low cost.

Also, the conventional wireless lighting control system should transmit control signals via WiFi wireless communication network with high data transmission amount; however, the data amount of the control signals is very low, so it is a waste to transmit the control signals via WiFi wireless communication network. On the contrary, according to one embodiment of the present invention, the wireless lighting control system may transmit the control signals via a low-power and low-cost network communication system, such as ZigBee wireless communication network, ZigBee wireless communication network, Bluetooth wireless communication network and Bluetooth Low Energy wireless communication network, etc.; therefore, the cost of the wireless lighting control system can be decreased.

Besides, the conventional wireless lighting control device is only used to control the lighting devices in a building; however, most of the lighting devices will not be frequently turned on or turned off; therefore, the utilization rate of the conventional wireless lighting control system is very low. On the contrary, according to one embodiment of the present invention, the wireless lighting control system may not only control the lighting devices, but also may allow other control systems with the wireless network communication protocol the same with that of the wireless lighting control system to transmit the control signals via the wireless network communication system of the wireless lighting control system without the need to construct another independent wireless network communication system; therefore, the idle time of the wireless lighting control system can be decreased to effectively increase the utilization rate of the wireless lighting control system.

Moreover, the coverage range of the wireless communication network of the conventional wireless lighting control system is limited; thus, if a controlled device is not within the coverage rage of the wireless communication network, the user cannot control the controlled device via the wireless communication network. On the contrary, according to one embodiment of the present invention, each of the electric energy supply devices of the wireless lighting control system can serve as a relay point for transmitting the control signals, so the control signals can be transmitted for a long distance; accordingly, the coverage range of the wireless lighting control system can will not be limited.

Figure 3:
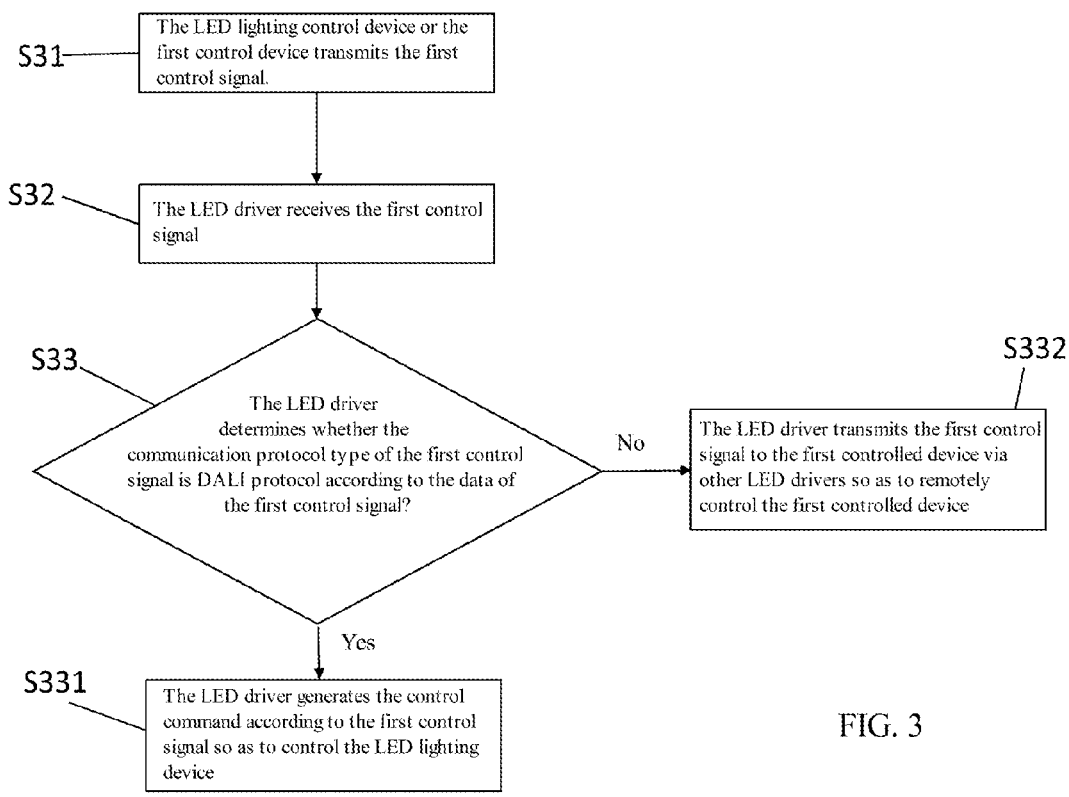
FIG. 3 is a flow chart of a first embodiment of a wireless lighting control system with data bridge function in accordance with the present invention.

With referent to FIG. 3 for a flow chart of a first embodiment of a wireless lighting control system with data bridge function in accordance with the present invention, the embodiment may include the following steps:

In the step S31: The LED lighting control device or the first control device transmits the first control signal, and the flow proceeds to the step S32.

In the step S32: The LED driver receives the first control signal, and the flow proceeds to the step S33.

In the step S32: The LED driver determines whether the communication protocol type of the first control signal is DALI protocol according to the data of the first control signal? If it is, the flow proceeds to the step S331; if it is not, the flow proceeds to the step S332.

In the step S331: The LED driver generates the control command according to the first control signal so as to control the LED lighting device.

In the step S332: The LED driver transmits the first control signal to the first controlled device via other LED drivers so as to remotely control the first controlled device.

Figure 4:
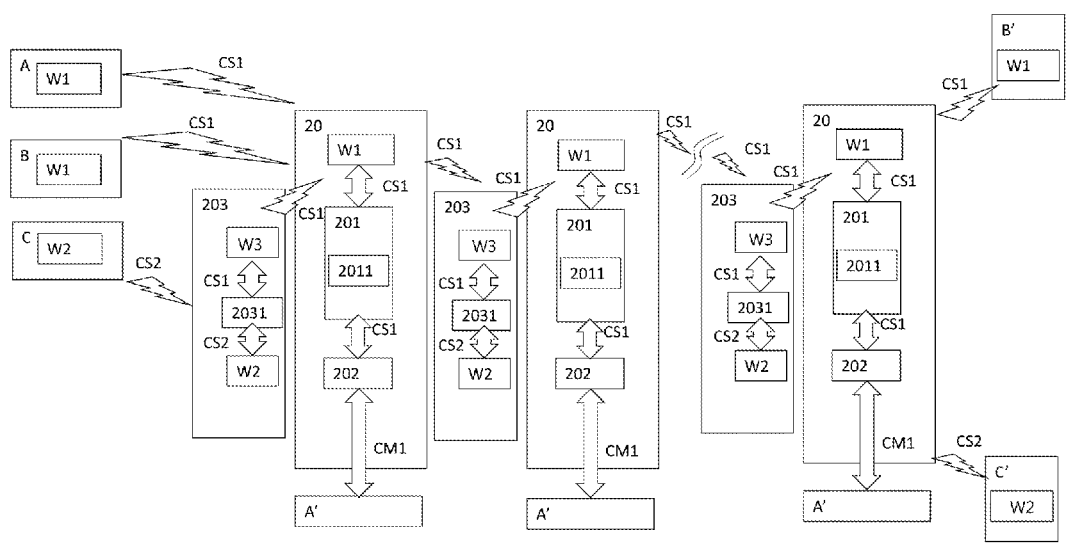
FIG. 4 is a schematic view of a second embodiment of a wireless lighting control system with data bridge function in accordance with the present invention.

With referent to FIG. 4 for a schematic view of a second embodiment of a wireless lighting control system with data bridge function in accordance with the present invention, the wireless lighting control system 2 may include a LED lighting control device A, a plurality of LED lighting device A', a first control device B, a first controlled device B', a second control device C, a second controlled device C' and a plurality of LED drivers 20.

The LED drivers 20 may be distributed over a building and there is a certain distance between any two adjacent LED drivers 20; each LED driver 20 may be connected to one LED lighting device A' to power it. The LED lighting control device A may transmit a first control signal CS1 based on ZigBee wireless network communication protocol to the LED drivers 20 via the first wireless communication module W1 so as to control the LED lighting devices A'. The first control device B may wirelessly transmit a first control signal CS1 based on ZigBee wireless network communication protocol via the first wireless communication module W1, and the first control signal CS1 may be transmitted to the first controlled device B' at a remote location by using the LED drivers 20 as the data bridge path. The second control device C may wirelessly transmit a second control signal CS2 based on Bluetooth wireless network communication protocol via the second wireless communication module W2, and the second control signal CS2 may be transmitted to the second controlled device C' at a remote location by using the LED drivers 20 as the data bridge path.

Each LED driver 20 may include a first wireless communication module W1, a microcontroller unit 201 and a driving circuit 202; the microcontroller unit 201 may include a data multiplexer 2011. The first wireless communication module W1 may receive or transmit a first control signal CS1 based on ZigBee wireless network communication protocol, and the first control signal CS1 may be transmitted to the microcontroller unit 201. The data multiplexer 2011 of the microcontroller unit 201 may identify the communication protocol type of the first control signal CS1. The driving circuit 202 may generate a control command CM1 according to the first control signal CS1 to drive the LED lighting device A'.

Similarly, when the data multiplexer 2011 receives the first control signal CS1 transmitted from the LED lighting control device A or the first control device B via the first wireless communication module W1, the data multiplexer 2011 may determine whether the communication protocol type of the first control signal CS1 is the digital addressable lighting interface (DALI) protocol for controlling the LED lighting device A'; if it is, the data multiplexer 2011 may generate the control command CM1 according to the first control signal CS1 to drive the LED lighting device A'; if it is not, the data multiplexer 2011 may use other LED drivers 20 as the data bridge path to transmit the first control signal CS1 to the LED driver 20 near the first controlled device B', and then the first control signal CS1 may be transmitted to the first controlled device B' via the LED driver 20 so as to remotely control the first controlled device B'.

The difference between the embodiment and the previous embodiment is that each LED driver 20 may further include a wireless signal translator 203, and the wireless signal translator 203 may include a third wireless communication module W3, a microcontroller unit 2031 and a second wireless communication module W2. The wireless signal translator 203 may receive the second control signal CS2 based on Bluetooth wireless network communication protocol from the second control device C; then, the microcontroller unit 2031 may convert the second control signal CS2 into a converted signal CS1 based ZigBee wireless network communication protocol, and transmit the converted signal CS1 to the microcontroller unit 201 via the third wireless communication module W3. The data multiplexer 2011 of the microcontroller unit 201 may determine that the communication protocol type of the converted signal CS1 is not DALI protocol according to the data of the converted signal CS1, and then may transmit the converted signal to the LED driver 20 near the second controlled device C'; afterward, the wireless signal translator 203 of the LED driver 20 may convert the converted signal CS1 into the second control signal CS2, and then may transmit the second control signal CS2 to the second controlled device C' via the second wireless communication module W2 so as to control the second controlled device C'. In other preferred embodiment, the second wireless communication module W2 may be based on ZigBee wireless communication protocol, WiFi wireless communication protocol, RFID wireless communication protocol or Infrared wireless network communication protocol, etc.

Figure 5:
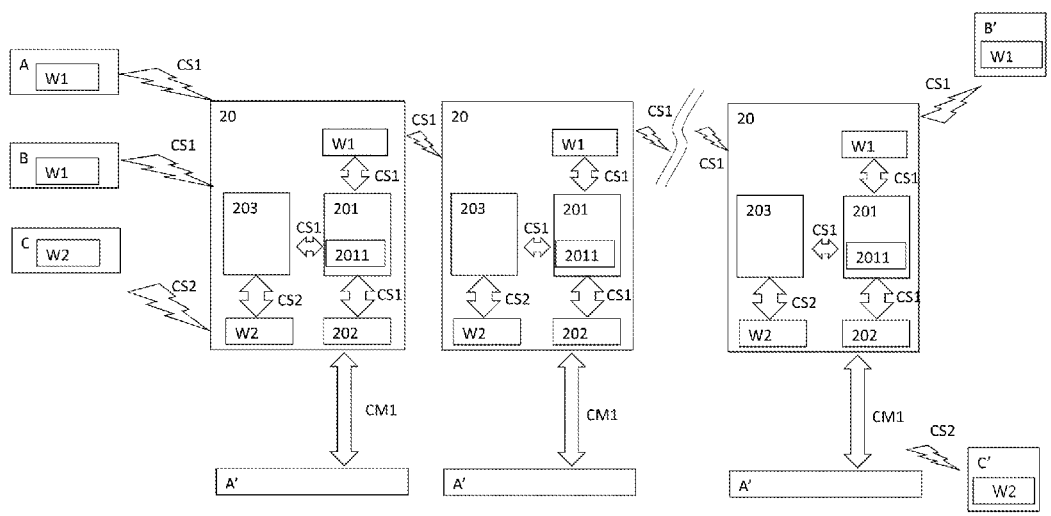
FIG. 5 is a schematic view of a third embodiment of a wireless lighting control system with data bridge function in accordance with the present invention.

With referent to FIG. 5 for a schematic view of a third embodiment of a wireless lighting control system with data bridge function in accordance with the present invention, the wireless lighting control system 2 may include a LED lighting control device A, a plurality of LED lighting device A', a first control device B, a first controlled device B', a second control device C, a second controlled device C' and a plurality of LED drivers 20.

Each LED driver 20 may include a first wireless communication module W1, a microcontroller unit 201, a driving circuit 202 and a wireless signal translator 203. The difference between the embodiment and the previous embodiment is that the wireless signal translator 203 in the embodiment may be integrated into the LED driver 20 in order to better the function of the LED driver 20.

The above embodiments are just for example instead of limitation; the present invention will not be limited thereby.

It is worthy to point out that the conventional wireless lighting control system can only be used control the lighting devices in a building; therefore, the conventional wireless lighting control system is very limited in use. On the contrary, according to one embodiment of the present invention, each of the electric energy supply devices of the wireless lighting control system can have a wireless signal translator; thus, other control systems with the wireless network communication protocol the same or different from that of the wireless lighting control system can transmit the control signals via the wireless network communication system of the wireless lighting control system without the need to construct another independent wireless network communication system; therefore, the idle time of the wireless lighting control system can be decreased to further increase the utilization rate of the wireless lighting control system; accordingly, the wireless lighting control system is more flexible in use. As described above, the present invention definitely has an inventive step.

Figure 6:
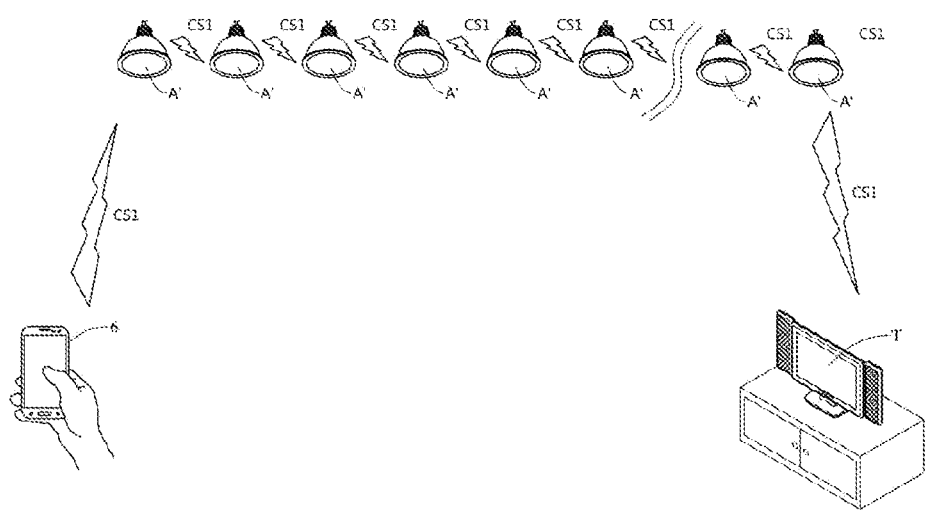
FIG. 6 is a schematic view of a fourth embodiment of a wireless lighting control system with data bridge function in accordance with the present invention.

With referent to FIG. 6 for a schematic view of a fourth embodiment of a wireless lighting control system with data bridge function in accordance with the present invention, the embodiment illustrates a usage situation of the wireless lighting control system with data bridge function according to the present invention.

As shown in FIG. 6, a user wants to use a mobile phone 6 to control a television T in a building and the television T is away from the user; the mobile phone 6 may transmit the first control signal CS1 via the wireless communication network of the wireless lighting control system. As the wireless lighting control system has a plurality of LED lighting devices A' and each of the LED lighting devices A' has a corresponding electric energy supply device, each of the electric energy supply device may serve as a relay point for transmitting the first control signal CS1, which can form a large data bridge path. In this way, the first control signal CS1 transmitted from the mobile phone 6 can successfully be transmitted to the television T away from the user via the data bridge path.

Figure 7:
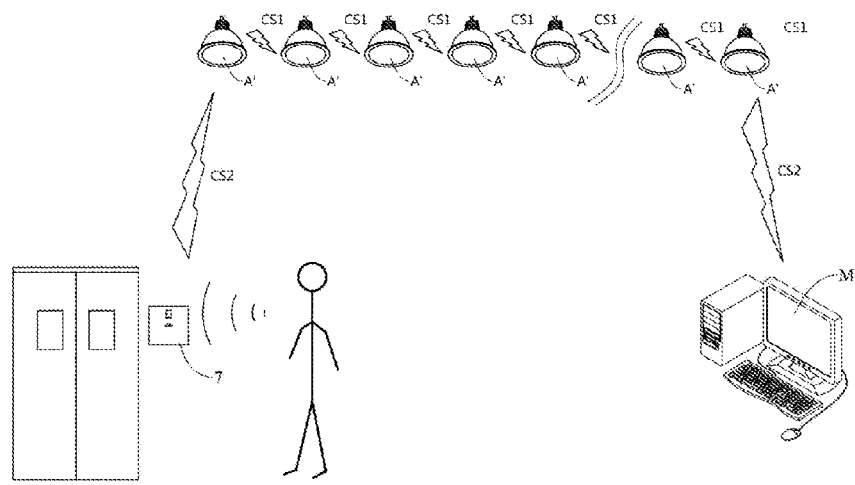
FIG. 7 is a schematic view of a fifth embodiment of a wireless lighting control system with data bridge function in accordance with the present invention.

With referent to FIG. 7 for a schematic view of a fifth embodiment of a wireless lighting control system with data bridge function in accordance with the present invention, the embodiment illustrates a usage situation of the wireless lighting control system with data bridge function according to the present invention.

The wireless lighting control system with data bridge function according to the present invention may also be applied to a hospital to track the locations of patients, or be applied to a factory to track the locations of expensive instruments. As shown in FIG. 7, a patient may wear a RFID tag and a plurality of RFID readers 7 can be installed on various locations of a hospital. When one of the RFID readers 7 reads the RFID tag worn by the patient, the RFID reader 7 may generate a sensing signal CS2. The sensing signal CS2 may be transmitted via the wireless communication network of the wireless lighting control system. As the wireless lighting control system has a plurality of LED lighting devices A' and each of the LED lighting devices A' has a corresponding electric energy supply device, each of the electric energy supply devices may serve as a relay point for transmitting the sensing signal CS2, which can form a large data bridge path. In this way, the sensing signal CS2 transmitted from the RFID reader 7 can successfully be transmitted to the monitoring device M away from the RFID reader 7 via the data bridge path.

The above embodiments are just for example instead of limitation; the present invention will not be limited thereby.

In summation of the description above, according to one embodiment of the present invention, the wireless lighting control system can be implemented via a low-power wireless communication network, which will not generate serious electromagnetic radiation; therefore, the wireless lighting control system will not influence the health of the user, so is of higher safety.

According to one embodiment of the present invention, the wireless lighting control system can be implemented via a wireless communication network with low data transmission amount, which is of low cost and sufficient for transmitting various control signals; therefore, the overall cost of the wireless lighting control system can be significantly reduced.

Besides, according to one embodiment of the present invention, each of the electric energy supply devices of the wireless lighting control system can have a data multiplexer, which can recognize the communication protocol type of the received first control signal so s to determine whether the first control signal is used to control the lighting devices or other controlled devices; therefore, other control systems with the wireless network communication protocol the same with that of the wireless lighting control system can transmit the control signals via the wireless network communication system of the wireless lighting control system without the need to construct another independent wireless network communication system; therefore, the idle time of the wireless lighting control system can be decreased to effectively increase the utilization rate of the wireless lighting control system; accordingly, the wireless lighting control system is flexible in use.

Moreover, according to one embodiment of the present invention, each of the electric energy supply devices of the wireless lighting control system can have a wireless signal translator; thus, other control systems with the wireless network communication protocol different from that of the wireless lighting control system can transmit the control signals via the wireless network communication system of the wireless lighting control system without the need to construct another independent wireless network communication system; therefore, the idle time of the wireless lighting control system can be decreased to further increase the utilization rate of the wireless lighting control system; accordingly, the wireless lighting control system is more flexible in use.

Furthermore, according to one embodiment of the present invention, each of the electric energy supply devices of the wireless lighting control system can serve as a relay point for transmitting the control signals; therefore, the whole wireless lighting control system can form a large data bridge path for transmitting the control signals for a long distance;

accordingly, the coverage range of the wireless lighting control system can be effectively increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electric energy supply device, connecting to at least one lighting device, comprising:
   a first wireless communication module, operable to receive or transmit a first control signal based on a first wireless network communication protocol;
   a multiplexing module, connected to the first wireless communication module and operable to identify a communication protocol type of the first control signal;
   a translation module operable to receive or transmit the first control signal based on the first wireless network communication protocol, and a second control signal based on a second wireless network communication protocol, and capable of converting the second control signal into a converted signal based on the first wireless network communication protocol; and
   a driving module, connected to the multiplexing module and operable to drive the lighting device according to the first control signal;
   wherein after the multiplexing module receives the first control signal from the first wireless communication module, the multiplexing module identifies the communication protocol type so as to determine whether to control the driving module to drive the lighting device according to the first control signal or transmit the first control signal to a first controlled device corresponding to the communication protocol type to remotely control the first controlled device by using other electric energy supply devices as a data bridge path.

2. The electric energy supply device of claim 1, wherein the translation module comprising:
   a third wireless communication module, operable to receive or transmit the first control signal based on the first wireless network communication protocol;
   a second wireless communication module, operable to receive or transmit the second control signal based on the second wireless network communication protocol; and
   a processing module, connected to the first wireless communication module and the second wireless communication module.

3. The electric energy supply device of claim 2, wherein when the multiplexing module determines that the communication protocol type is a digital addressable lighting interface protocol, the multiplexing module controls the driving module to drive the lighting device according to the first control signal.

4. The electric energy supply device of claim 2, wherein when the second communication module receives the second control signal from a second control device, the processing module converts the second control signal into the converted signal based on the first wireless network communication protocol and transmits the converted signal to the multiplexing module via the third wireless communication module; the multiplexing module transmits the converted signal according to the communication protocol type of the converted signal to a second controlled device corresponding to the communication protocol type so as to remotely control the second controlled device.

5. The electric energy supply device of claim 4, wherein the electric energy supply device is a LED driver, an electronic ballast, a power supply or a wireless charger.

6. The electric energy supply device of claim 4, wherein the translation module is wirelessly or wiredly connected to the multiplexing module.

7. The electric energy supply device of claim 4, wherein the first wireless communication module and the third wireless communication module are based on a ZigBee wireless network communication protocol or a Bluetooth wireless network communication protocol.

8. The electric energy supply device of claim 7, wherein the second wireless communication module is based on the ZigBee wireless network communication protocol, the Bluetooth wireless network communication protocol, a WiFi wireless network communication protocol, a RFID wireless network communication protocol or an infrared wireless network communication protocol.

9. The electric energy supply device of claim 8, wherein the Bluetooth wireless network communication protocol is a Bluetooth Low Energy wireless network communication protocol.

10. A wireless lighting control system, comprising:
    a plurality of lighting devices;
    at least one first controlled device;
    a lighting control device, operable to wirelessly control the lighting devices;
    a first control device, operable to wirelessly control the first controlled device; and
    a plurality of electric energy supply devices, each of the electric energy supply devices being connected to at least one of the lighting devices and receiving a first control signal based on a first wireless network communication protocol, wherein each of the electric energy supply devices comprises a translation module operable to receive or transmit the first control signal based on the first wireless network communication protocol, and a second control signal based on a second wireless network communication protocol, and capable of converting the second control signal into a converted signal based on the first wireless network communication protocol;
    wherein when any one of the electric energy supply devices receives the first control signal from the lighting control device or the first control device, the electric energy supply device identifies a communication protocol type of the first control signal according to a data of the first control signal so as to determine whether to control the lighting device corresponding to the electric energy supply device according to the first control signal or transmit the first control signal to a first controlled device corresponding to the communication protocol type by using other electric energy supply devices as a data bridge path so as to remotely control the first controlled device.

11. The wireless lighting control system of claim 10, wherein each of the electric energy supply device comprises:
    a first wireless communication module, operable to receive or transmit the first control signal based on the first wireless network communication protocol;
    a multiplexing module, operable to connect to the first wireless communication module, and identify a communication protocol type of the first control signal according to a data of the first control signal; and
    a driving module, connected to the multiplexing module, and controlling the lighting device corresponding to the driving module according to the first control signal.

12. The wireless lighting control system of claim 11, wherein when the multiplexing module determines the communication protocol type is a digital addressable lighting interface protocol, the multiplexing module controls the driving module to drive the lighting device according to the first control signal.

13. The wireless lighting control system of claim 12, wherein when the multiplexing module receives the first control signal via the first wireless communication module, the multiplexing module determines whether to use the first control signal to control the driving module to drive the lighting device according to the communication protocol type or serve as a data bridge path to transmit the first control signal to a first controlled device corresponding to the communication protocol type so as to remotely control the first controlled device.

14. The wireless lighting control system of claim 13, further comprising:
at least one second controlled device; and
a second control device, operable to wirelessly control the second controlled device.

15. The wireless lighting control system of claim 14, wherein the translation module comprises:
a third wireless communication module, operable to receive or transmit the first control signal based on the first wireless network communication protocol;
a second wireless communication module, operable to receive or transmit the second control signal based on the second wireless network communication protocol; and
a processing module, connected to the first wireless communication module and the second wireless communication module.

16. The wireless lighting control system of claim 15, wherein when the second communication module receives the second control signal from the second control device, the processing module converts the second control signal into the converted signal based on the first wireless network communication protocol and transmits the converted signal to the multiplexing module via the third wireless communication module; the multiplexing module transmits the converted signal according to the communication protocol type of the converted signal to a second controlled device corresponding to the communication protocol type so as to remotely control the second controlled device.

17. The wireless lighting control system of claim 16, wherein the electric energy supply devices are LED drivers, electronic ballasts, power supplies or wireless chargers.

18. The wireless lighting control system of claim 16, wherein the translation modules are wirelessly or wiredly connected to the multiplexing modules.

19. The wireless lighting control system of claim 16, wherein the first wireless communication modules and the third wireless communications are based on a ZigBee wireless network communication protocol or a Bluetooth wireless network communication protocol.

20. The wireless lighting control system of claim 19, wherein the second wireless communication modules are based on the ZigBee wireless network communication protocol, the Bluetooth wireless network communication protocol, a WiFi wireless network communication protocol, a RFID wireless network communication protocol or an infrared wireless network communication protocol.

21. The wireless lighting control system of claim 20, wherein the Bluetooth wireless network communication protocol is a Bluetooth Low Energy wireless network communication protocol.

* * * * *